United States Patent
Sennyu et al.

(10) Patent No.: US 8,951,936 B2
(45) Date of Patent: Feb. 10, 2015

(54) METHOD OF MANUFACTURING SUPERCONDUCTING ACCELERATOR CAVITY

(75) Inventors: Katsuya Sennyu, Tokyo (JP); Hiroshi Hara, Tokyo (JP); Takehisa Okuda, Tokyo (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 58 days.

(21) Appl. No.: 13/636,166

(22) PCT Filed: May 9, 2011

(86) PCT No.: PCT/JP2011/060672
§ 371 (c)(1),
(2), (4) Date: Sep. 20, 2012

(87) PCT Pub. No.: WO2011/142324
PCT Pub. Date: Nov. 17, 2011

(65) Prior Publication Data
US 2013/0012397 A1 Jan. 10, 2013

(30) Foreign Application Priority Data
May 12, 2010 (JP) .................. 2010-110145

(51) Int. Cl.
*H01L 39/24* (2006.01)
*H05H 7/20* (2006.01)
(Continued)

(52) U.S. Cl.
CPC .............. *H05H 7/20* (2013.01); *B23K 15/04* (2013.01); *B23K 26/206* (2013.01); *B23K 26/28* (2013.01); *B23K 33/00* (2013.01); *B23K 26/122* (2013.01); *B23K 2201/04* (2013.01)
USPC ........... 505/480; 505/300; 505/200; 505/210; 29/599; 315/500; 219/121.64

(58) Field of Classification Search
CPC ............. H05H 7/18; H05H 7/20; H05H 9/00; H01P 7/006; H01P 7/06; H01L 39/24; H01L 39/2406; H01L 39/2409; H01L 39/249; B23K 15/04; B23K 26/206; B23K 26/28; B23K 26/122; B23K 33/00; B23K 2201/04
USPC .......... 505/200, 210, 300; 315/500, 502, 505; 333/227–231, 99 S; 148/96–98; 29/599; 219/121.63, 121.64; 228/103, 145, 228/173.4
See application file for complete search history.

(56) References Cited

U.S. PATENT DOCUMENTS 5,239,157 A * 8/1993 Sakano et al. ........... 219/121.64

FOREIGN PATENT DOCUMENTS

| JP | 51-151237 | | 12/1976 | |
|----|-----------|--|---------|--|
| JP | 51-151237 | A * | 12/1976 | ............. B23K 15/00 |

(Continued)

OTHER PUBLICATIONS

International Search Report issued Jun. 7, 2011 in corresponding International Application No. PCT/JP2011/060672.
(Continued)

*Primary Examiner* — Stanley Silverman
*Assistant Examiner* — Kallambella Vijayakumar
(74) *Attorney, Agent, or Firm* — Wenderoth, Lind & Ponack, L.L.P.

(57) ABSTRACT

Provided is a method of manufacturing a superconducting accelerator cavity in which a plurality of half cells having opening portions (equator portions and iris portions) at both ends thereof in an axial direction are placed one after another in the axial direction, contact portions where the corresponding opening portions come into contact with each other are joined by welding, and thus, a superconducting accelerator cavity is manufactured, the half cells to be joined are arranged so that the axial direction thereof extends in a vertical direction; and concave portions that are concave towards an outer side are also formed at inner circumferential surfaces located below the contact portions of the half cells positioned at a bottom; and the contact portions are joined from outside by penetration welding.

2 Claims, 4 Drawing Sheets

(51) Int. Cl.
    *B23K 26/12*   (2014.01)
    *B23K 33/00*   (2006.01)
    *B23K 15/04*   (2006.01)
    *B23K 26/20*   (2014.01)
    *B23K 26/28*   (2014.01)

(56) References Cited

FOREIGN PATENT DOCUMENTS

| JP | 4-322100 | | 11/1992 | | |
| JP | 04-322100 | A * | 11/1992 | ............... | H05H 7/20 |
| JP | 9-180899 | | 7/1997 | | |
| JP | 2000-260599 | | 9/2000 | | |
| JP | 2000-348900 | | 12/2000 | | |
| JP | 2000-348900 | A * | 12/2000 | ............... | H05H 7/20 |
| JP | 3416249 | | 6/2003 | | |
| JP | 2006-236797 | | 9/2006 | | |
| JP | 2006-318890 | | 11/2006 | | |

OTHER PUBLICATIONS

Written Opinion of the International Searching Authority issued Jun. 7, 2011 in corresponding International Application No. PCT/JP2011/060672.

Office Action issued Aug. 20, 2013 in corresponding Japanese Application No. 2010-110145 (with partial English translation).

Notice of Reason(s) for Refusal issued Nov. 5, 2013 in corresponding Japanese Application No. 2010-110145 (with partial English translation).

Decision to Grant a Patent dated Jul. 8, 2014 issued in Japanese Patent Application No. 2010-110145.

* cited by examiner

METHOD OF MANUFACTURING SUPERCONDUCTING ACCELERATOR CAVITY

TECHNICAL FIELD

The present invention relates to a method of manufacturing a superconducting accelerator cavity.

BACKGROUND ART

Because a superconducting accelerator cavity accelerates elementary particles that pass through the interior thereof, the characteristics of the inner surfaces thereof are important in order for a superconducting accelerator cavity to achieve a certain level of performance.

A superconducting accelerator cavity is formed by joining a plurality of ring-shaped members, such as cells, beam pipes, and so forth, which are placed one after another in an axial direction (see Patent Literature 1 and Patent Literature 2).

This joining is conventionally performed from outside by means of penetration welding in the form of electron beam welding or laser welding in a vacuum atmosphere because a vacuum atmosphere has low contamination caused by impurities.

In the case in which penetration welding from outside is employed in this way, unexpected irregularities sometimes occur in the welding condition inside the superconducting accelerator cavity, and post-processing thereof is time-consuming.

Because of this, as disclosed in Patent Literature 1 and Patent Literature 2, the welding work is typically performed by placing the plurality of ring-shaped members one after another in the axial direction so as to be horizontally oriented and by joining them so that joints are oriented in a vertical direction. By doing so, weld beads can be made substantially uniform on both sides of the joints, thus making it possible to form relatively smooth weld beads.

CITATION LIST

Patent Literature

{PTL 1} Japanese Unexamined Patent Application, Publication No. Hei 9-180899
{PTL 2} Japanese Unexamined Patent Application, Publication No. 2006-318890

SUMMARY OF INVENTION

Technical Problem

When the plurality of ring-shaped members are placed one after another in the axial direction so as to be horizontally oriented, because a center portion thereof tends to move downward due to gravity, a defective product may result due to deformation.

The plurality of ring-shaped members are supported by large, strong jigs in order to suppress this deformation caused by the weight, and this presents a problem in that the size of a welding apparatus increases, which also makes placement of the ring-shaped members complicated and time consuming.

When the plurality of ring-shaped members are joined by placing them one after another in the axial direction so as to be oriented in the vertical direction, because positional shifting at the joints due to gravity is suppressed, the large jigs for supporting the plurality of ring-shaped members can be omitted, and the above-described problems can be eliminated.

However, because the joints extend substantially in the horizontal direction in this case, molten drops tend to hang downward due to gravity. Because this consequently produces protruding weld beads at inner circumferential surfaces of ring-shaped bodies at the bottom, there is a problem in that post-processing therefor is time consuming.

The present invention has been conceived in light of the above-described circumstances, and an object thereof is to provide a method of manufacturing a superconducting accelerator cavity with which a support structure at the time of welding can be simplified and which also makes inner surfaces of a product smooth.

Solution to Problem

In order to solve the above-described problems, the present invention employs the following solutions.

An aspect of the present invention is a method of manufacturing a superconducting accelerator cavity in which a plurality of ring-shaped bodies having opening portions at both ends thereof in an axial direction are placed one after another in the axial direction, contact portions where corresponding opening portions come into contact with each other are joined by welding, and thus, a superconducting accelerator cavity is manufactured, wherein the ring-shaped bodies to be joined are arranged so that the axial direction thereof extends in a vertical direction; and concave portions that are concave towards an outer side are also formed at inner circumferential surfaces located below the contact portions of the ring-shaped bodies positioned at a bottom; and wherein the contact portions are joined from outside by means of penetration welding.

With the method of manufacturing a superconducting accelerator cavity according to the aspect of the present invention, the ring-shaped bodies to be joined are arranged so that the axial direction extends in the vertical direction. In other words, the contact portions where the corresponding opening portions come in contact with each other are positioned so as to extend substantially in the horizontal direction. The ring-shaped bodies are joined with each other by applying penetration welding from outside of the contact portions formed in this way.

Because the ring-shaped bodies to be joined are arranged in this way so that the axial direction thereof extends in the vertical direction, positional shifting of the contact portions due to gravity can be sufficiently suppressed by the ring-shaped bodies themselves. Therefore, because it is possible to simplify a structure for holding the plurality of ring-shaped members, the size of the welding apparatus can be reduced, and the work involved in placing the ring-shaped members can also be performed easily and in a short period of time.

In addition, because the concave portions that are concave towards the outer side are formed at the inner circumferential surfaces located below the contact portions of the ring-shaped bodies positioned on the bottom side, the molten drops that hang downward due to gravity flow into the concave portions. Because the molten drops do not protrude inward if the molten drops that hang downward flow into the concave portions in this way, in other words, if they fill the concave portions, the weld beads formed on the inner circumferential surfaces of the ring-shaped bodies can be made smooth.

In other words, in consideration of the molten drops that hang downward due to gravity, the amount of molten drops that occur at the bottom-side ring-shaped bodies (volume of the bottom-side ring-shaped bodies) is reduced or, conversely, the amount of molten drops that occur at the top-side ring-shaped bodies (volume of the top-side ring-shaped bodies) is increased.

When the weld beads are made smooth in this way, the time required for post-processing can be reduced.

In this case, the concave portions may be formed so that a depth thereof decreases toward the bottom side.

Advantageous Effects of Invention

With the present invention, because the ring-shaped bodies to be joined are arranged so that the axial direction extends in the vertical direction, the size of the welding apparatus can be reduced, and the work involved in placing the ring-shaped members can also be performed easily and in a short period of time.

In addition, because concave portions that are concave towards the outer side are formed at inner circumferential surfaces located below the contact portions of the ring-shaped bodies positioned at the bottom, weld beads formed at the inner circumferential surfaces of the ring-shaped bodies can be made smooth.

DESCRIPTION OF EMBODIMENT

An embodiment of the present invention will be described below by using FIGS. 1 to 7.

Figure 1:
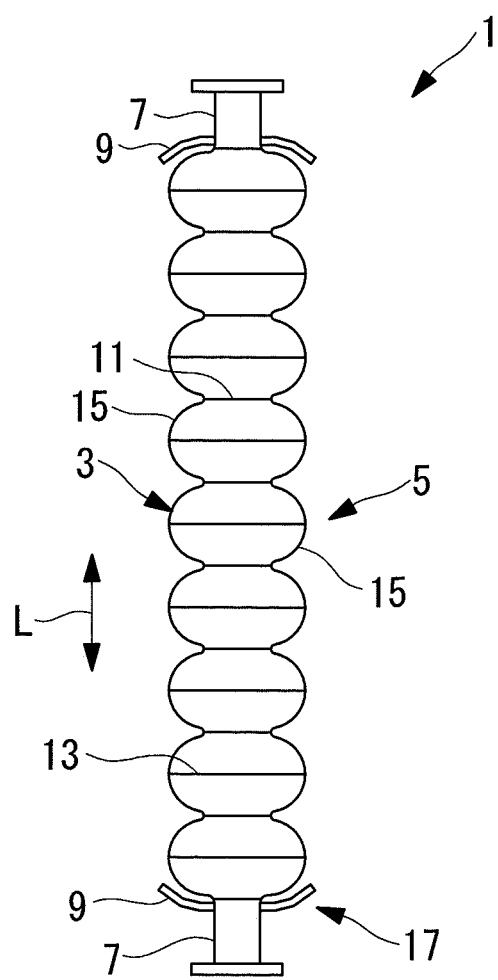
FIG. 1 is a cross-sectional view of a superconducting accelerator cavity manufactured with a method of manufacturing a superconducting accelerator cavity according to an embodiment of the present invention.

FIG. 1 is a cross-sectional view of a superconducting accelerator cavity manufactured with a method of manufacturing a superconducting accelerator cavity according to the embodiment of the present invention.

As shown in FIG. 1, a superconducting accelerator cavity 1 is provided with a cavity portion 5, in which, for example, nine hollow cylindrical cells (ring-shaped bodies) 3 with swollen center portions are combined by being joined by means of welding, and a pair of hollow cylindrical beam pipes (ring-shaped bodies) 7 that are attached at both ends of the cavity portion 5.

End plates 9 that form two ends of a jacket, which is a container formed so as to surround the cavity portion 5, are attached to outer circumferential surfaces of the individual beam pipes 7 at the cavity portion 5 sides thereof.

Although illustrations thereof are omitted, the beam pipes 7 are provided with input ports to which input couplers are attached, higher order mode couplers that release higher order modes, which inhibit acceleration of beams excited in the cavity portion 5, outside the cavity portion 5, and so forth.

Iris portions 11, which are the narrowest portions formed between cells 3, are formed in the cavity portion 5. The cells 3 have the most-swollen portions at center portions thereof in the axial direction L. These most-swollen portions will be referred to as equator portions 13.

The cells 3 are formed of half cells (ring-shaped bodies) 15 that are divided in two in the axial direction L with the equator portions 13 serving as boundaries therebetween. The two ends of the half cells 15 form the iris portions (opening portions) 11 and the equator portions (opening portions) 13.

The half cells 15 and the beam pipes 7 are formed of a superconducting material, for example, a niobium-based material.

A method of manufacturing the superconducting accelerator cavity 1 will be described below.

First, the beam pipes 7, the end plates 9, and the half cells 15 are manufactured as individual constituent members.

First, two end parts (ring-shaped bodies) 17 formed of the beam pipes 7, the end plates 9, and the half cells 15 are manufactured. The end parts 17 are formed by joining inner circumferential portions of the end plates 9 with the outer circumferential sides at one end of the beam pipes by means of welding and by joining the iris portions 11 of the half cells 15 with inner circumferential sides thereof by means of welding.

Next, the two end parts 17 and a plurality of half cells 15 are joined by means of welding with a welding apparatus.

First, one end part 17 is placed in the welding apparatus so that the axial direction L thereof extends in the vertical direction and so that the half cell 15 therefor is positioned above.

Next, the plurality of half cells 15 are placed one after another in the axial direction L so that the equator portions 13 are overlaid on each other or so that the iris portions 11 are overlaid on each other, and the other end part 17 is stacked on top of them.

In this way, because the half cells 15 of the end parts 17 and the plurality of half cells 15 to be joined by means of welding are arranged so that the axial direction thereof extends in the vertical direction, corresponding contact portions 21 between them extend substantially in the horizontal direction. In the case in which the contact portions 21 extend horizontally, because position shifting of the contact portions 21 due to gravity can be sufficiently suppressed by the half cells 15 themselves, etc., it is possible to simplify the structure for holding the half cells 15 and so forth. Accordingly, the size of the welding apparatus can be reduced and the work involved in placing the half cells 15, etc. can also be performed easily and in a short period of time.

Figure 2:
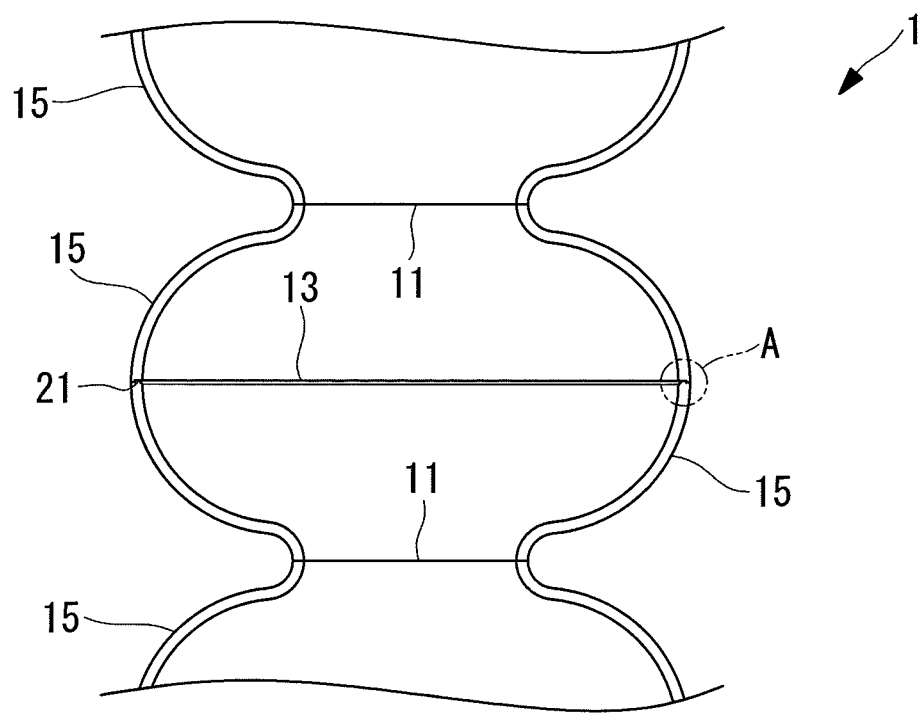
FIG. 2 is a cross-sectional view showing, in enlarged form, a portion of the superconducting accelerator cavity in FIG. 1.
Figure 3:
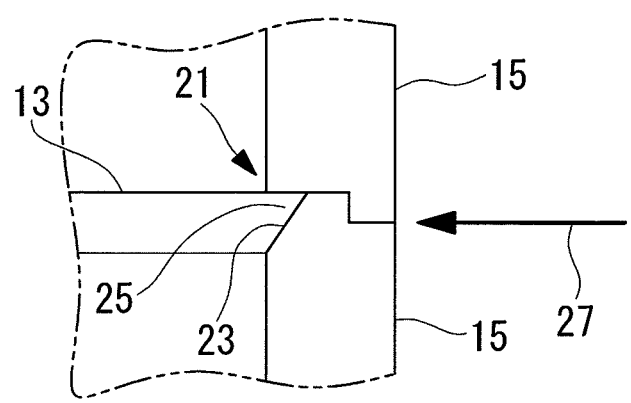
FIG. 3 is a partial cross-sectional view showing a portion A in FIG. 2

Next, the contact portions 21 will be described on the basis of FIGS. 2 and 3. For example, two half cells 15 form the contact portion 21 by being overlaid on each other at the equator portions 13. Recessed-butt-joint processing is applied to end surfaces of the two half cells 15 so that their positions do not shift in the horizontal direction when they are stacked.

A straight chamfer 23 is formed at an inner-circumferential-side end surface of the half cell 15 positioned at the bottom. By doing so, the bottom end surface of the half cell 15 positioned above and the chamfer 23 form, at the contact portion 21, a concave portion 25 that is concave toward the outer side at an inner circumferential surface of the half cell 15 positioned at the bottom.

The concave portion 25 is formed so that the depth in the horizontal direction decreases toward the bottom side thereof.

Figure 5:
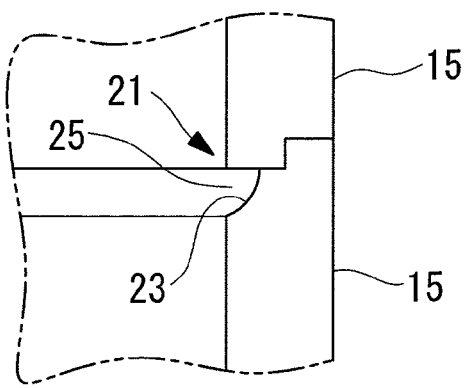
FIG. 5 is a partial cross-sectional view showing another embodiment for the portion A in FIG. 2

Although the chamfer 23 that forms the concave portion 25 is formed in a straight line in this embodiment, it is not limited thereto, and it may be curvilinear; in addition, the concave portion 25 may be formed with a curvilinear notch that protrudes outward, as shown in FIG. 5.

Figure 6:
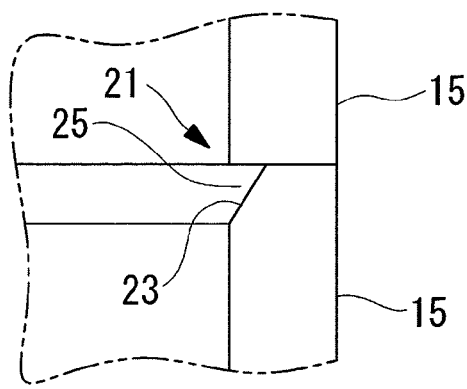
FIG. 6 is a partial cross-sectional view showing yet another embodiment for the portion A in FIG. 2

In addition, although the recessed-butt-joint processing is applied to the end surfaces of two half cells 15 in this embodiment, it is not limited thereto, and they may be flat surfaces, as shown in FIG. 6.

The contact portions 21 configured in this way are irradiated so as to be penetrated from outside with, for example, beams 27, thus performing electron beam welding of the contact portions 21.

The welding method is not limited to electron beam welding, and it may be laser welding.

When the beams 27 are radiated from outside so as to penetrate in this way, molten drops are formed due to heating by the beams 27. Because the molten drops have liquid properties, they move easily and move downward due to gravity.

Figure 7:
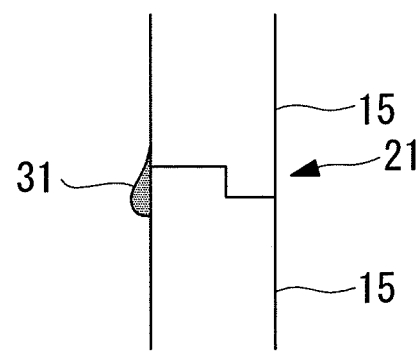
FIG. 7 is a partial cross-sectional view showing a state of a molten drop in the related art.

As shown in FIG. 7, with the contact portions 21 that are simply abutted, as has conventionally been done, the molten drops hang along the inner surfaces of the half cells 15, thus forming weld beads 31 that protrude more toward the bottom side of the inner circumferential surfaces of the half cells 15.

Figure 4:
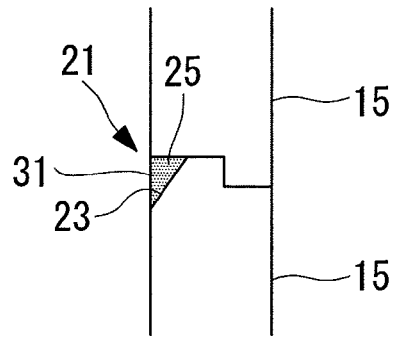
FIG. 4 is a partial cross-sectional view showing the state of a molten drop at the portion A in FIG. 2.

Because the concave portions 25 are formed in this embodiment, for example, as shown in FIG. 4, the molten drops that hang downward due to gravity flow into the concave portions 25. Because the molten drops do not protrude inward if the molten drops that hang downward flow into the concave portions 25 in this way, in other words, if they fill the concave portions 25, the weld beads 31 formed at the inner circumferential surfaces of the half cells 15 can be made smooth.

In other words, in consideration of the molten drops that hang downward due to gravity, the amount of molten drops that occur at the bottom-side half cells 15 (volume of the bottom-side half cells 15 that melt) is reduced or, conversely, the amount of molten drops that occur at the top-side half cells 15 (volume of the top-side half cells that melt) is increased.

When the weld beads 31 are made smooth in this way, the time required for post-processing can be reduced.

The present invention is not limited to the embodiment described above, and various modifications are possible within a range that does not depart from the spirit of the present invention.

For example, although the half cells 15 are joined with each other in this embodiment, it is not limited thereto. For example, dumbbells may be formed as ring-shaped bodies in which two half cells 15 are welded so that the corresponding iris portions 11 are overlaid on each other, and these dumbbells may be joined with each other. In addition, dumbbells formed by processing pipe members may be joined with each other. The cavity portion 5 may be integrally formed in portions or as a whole to form a ring-shaped body.

REFERENCE SIGNS LIST 1 superconducting accelerator cavity
3 cell
7 beam pipe
11 iris portion
13 equator portion
21 contact portion
25 concave portion
L axial direction

The invention claimed is:

1. A superconducting-accelerator-cavity manufacturing method in which a plurality of ring-shaped bodies having opening portions at both ends thereof in an axial direction are placed one after another in the axial direction, contact portions where corresponding opening portions come into contact with each other are joined by welding, and thus, a superconducting accelerator cavity is manufactured,
   wherein the ring-shaped bodies to be joined are arranged so that the axial direction thereof extends in a vertical direction, and concave portions that are concave towards an outer side are formed at inner circumferential surfaces by forming a chamfer at an inner-circumferential-side end surface which is located below the contact portions of the ring-shaped bodies positioned at a bottom, and
   wherein the contact portions are joined by penetration welding by irradiating the contact portions with beams from outside with all of the plurality of ring-shaped bodies being arranged so that the concave portions are arranged in a horizontal direction.

2. A superconducting-accelerator-cavity manufacturing method according to claim 1, wherein the concave portions are formed so that a depth thereof decreases toward a bottom side.

* * * * *